US006635140B2

(12) United States Patent
Phillips et al.

(10) Patent No.: US 6,635,140 B2
(45) Date of Patent: Oct. 21, 2003

(54) SHINGLE SYNCHRONIZATION BETWEEN BLEND DROP AND CUT, AND BETWEEN PATTERN AND PATTERN CUTTER

(75) Inventors: John David Phillips, Pataskala, OH (US); David Russell Rodenbaugh, Baltimore, OH (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 23 days.

(21) Appl. No.: 10/055,459

(22) Filed: Jan. 22, 2002

(65) Prior Publication Data

US 2002/0092596 A1 Jul. 18, 2002

Related U.S. Application Data

(62) Division of application No. 09/607,489, filed on Jun. 30, 2000, now abandoned.

(51) Int. Cl.[7] .......... B32B 31/00; E04D 1/12

(52) U.S. Cl. .......... 156/259; 156/64; 156/269; 156/271; 156/351; 156/361; 156/378; 156/512; 83/920

(58) Field of Search .......... 52/554, 557; 83/920, 83/32; 156/259, 264, 271, 279, 351, 361, 512, 64, 378

(56) References Cited

U.S. PATENT DOCUMENTS

| | | | | |
|---|---|---|---|---|
| 3,998,685 A | | 12/1976 | Czyzewski et al. | 156/260 |
| 4,198,257 A | | 4/1980 | Pfaff | 156/260 |
| 4,233,100 A | | 11/1980 | Cunningham et al. | 156/260 |
| 4,729,814 A | | 3/1988 | Jennus et al. | 156/512 |
| 4,737,904 A | | 4/1988 | Ominato | 364/167 |
| 4,775,440 A | | 10/1988 | Jennus et al. | 156/260 |
| 4,781,090 A | | 11/1988 | Feldkamper et al. | 83/74 |
| 4,869,942 A | | 9/1989 | Jennus et al. | 428/77 |
| 5,052,162 A | | 10/1991 | Bush et al. | 52/518 |
| 5,062,340 A | | 11/1991 | Greven | 83/95 |
| 5,102,487 A | | 4/1992 | Lamb | 156/260 |
| 5,209,802 A | | 5/1993 | Hannah et al. | 118/59 |
| 5,961,780 A | | 10/1999 | Kalkanoglu et al. | 156/157 |
| 6,014,847 A | | 1/2000 | Phillips | 52/311.1 |
| 6,038,826 A | | 3/2000 | Stahl et al. | |
| 6,289,648 B1 | * | 9/2001 | Freshwater et al. | 52/557 |
| 6,421,976 B1 | * | 7/2002 | Elliott et al. | 52/555 |

* cited by examiner

*Primary Examiner*—Linda Gray
(74) *Attorney, Agent, or Firm*—Inger H. Eckert; James J. Dottavio

(57) ABSTRACT

A method and apparatus are provided to place a series of timing marks on a granule covered roofing sheet. A rotary pattern cutter cuts a pattern of tabs and cutouts in the continuous granule covered sheet. The rotary position of the pattern cutter and the position of the timing marks are sensed, and the position of the continuous granule covered sheet with respect to the rotary position of the pattern cutter is synchronized in response to the sensed position of the timing marks and the sensed rotary position of the pattern cutter.

10 Claims, 3 Drawing Sheets

SHINGLE SYNCHRONIZATION BETWEEN BLEND DROP AND CUT, AND BETWEEN PATTERN AND PATTERN CUTTER

The present application is a division of co-pending U.S. patent application Ser. No. 09/607,489, entitled SHINGLE SYNCHRONIZATION BETWEEN BLEND DROP AND CUT, AND BETWEEN PATTERN AND PATTERN CUTTER, filed Jun. 30, 2000, now abandoned.

The present invention may also be related to the following U.S. patent applications: Ser. No. 09/607,271, entitled TABBED SHINGLES LENGTH CUT AT MID-TAB, filed Jun. 30, 2000 now U.S. Pat. No. 6,487,828; and Ser. No. 09/607,270, entitled METHOD OF MAKING SHINGLES OF TWO DIFFERENT DIMENSIONS USING A COMMON SHINGLE filed Jun. 30, 2000 now U.S. Pat. No. 6,521,076.

TECHNICAL FIELD

This invention relates to a method of making roofing shingles. More particularly, this invention relates to a method of improving the synchronization between blend drop and cutting of roofing shingles.

BACKGROUND OF THE INVENTION

The use of aesthetically pleasing roofing shingles is popular among consumers. Aesthetically pleasing roofing shingles are produced by varying the pattern of colors in the shingles as well as their length, and spacing between their tabs, cutouts, and notches. The color of shingles can be varied by placing colored granules in patterns at specified locations with respect to the patterns of cuts, such as length cuts and tab cuts, in the shingles. Color patterns which are misplaced at undesirable locations with respect to the tabs, cutouts, and notches in the shingles produce poor quality shingles. Thus, it would be desirable to produce a method of synchronizing the placement of the color patterns with respect to the tabs, cutouts, and notches in the shingles.

SUMMARY OF THE INVENTION

The above objects as well as other objects not specifically enumerated are achieved by a method and apparatus to synchronize the blend drop and cutting of roofing shingles. The method and apparatus include providing a continuous shingle mat coated with roofing asphalt. The mat is covered with granules to form a continuous granule covered sheet. A series of timing marks are placed on the continuous granule covered sheet. A rotary pattern cutter cuts a pattern of tabs and cutouts in the continuous granule covered sheet. The rotary position of the pattern cutter and the position of the timing marks are sensed. The position of the continuous granule covered sheet with respect to the rotary position of the pattern cutter is synchronized in response to the sensed position of the timing marks and the sensed rotary position of the pattern cutter. The continuous granule covered sheet is cut with the pattern cutter. The apparatus preferably includes an applicator for placing a series of timing marks on the continuous granule covered sheet and a photoeye for sensing the position of the timing marks. Accordingly the method and apparatus provide improved synchronization between the blend drop and cutting of the roofing shingles.

Various objects and advantages of this invention will become apparent to those skilled in the art from the following detailed description of the preferred embodiment, when read in light of the accompanying drawings.

DETAILED DESCRIPTION OF THE INVENTION

Composite shingles, such as asphalt shingles, are a commonly used roofing product. Asphalt shingle production generally includes feeding a base material from a roll fed downstream and coating it first with a composite material, then a layer of granules. The base material is typically made from a fiberglass mat provided in a continuous shingle membrane or sheet. It should be understood that the base material can be any suitable support material.

The composite material, such as an asphalt material, is added to the continuous shingle membrane for strength and improved weathering characteristics. It should be understood that the composite material can be any suitable material, preferably low in cost, durable, and resistant to fire. The layer of granules is typically applied with one or more granule applicators, such as pneumatic blenders, to the asphalt material covering the continuous shingle membrane. The pneumatic blender is a type of granule applicator known in the art. The granules shield the asphalt material from direct sunlight, offer resistance to fire, and provide texture to the shingle. The granules can be colored in a way known in the art, preferably before being applied to the continuous shingle membrane. The granules are preferably applied to the continuous shingle membrane in color patterns to provide the shingles with an aesthetically pleasing appearance.

Figure 1:
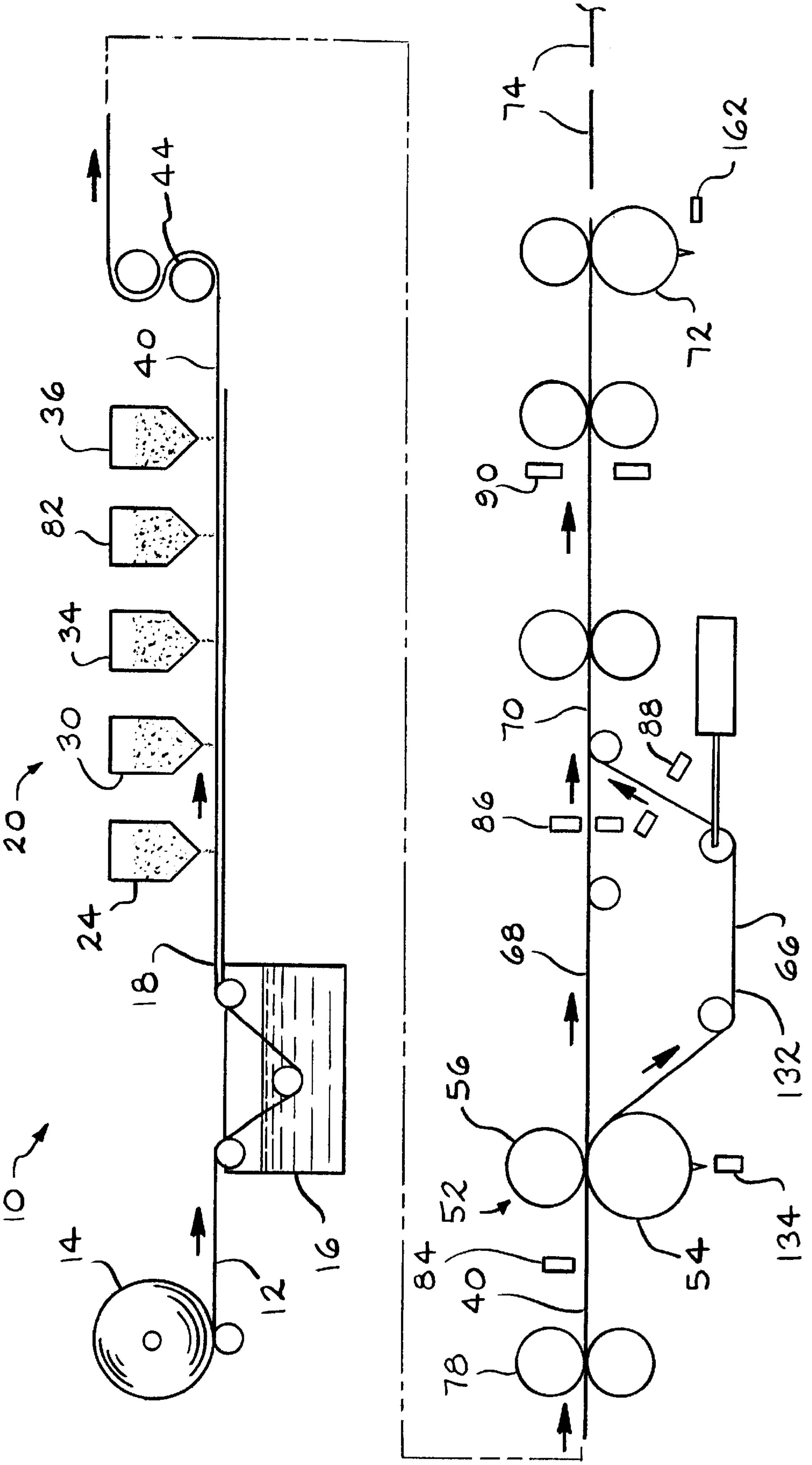
FIG. 1 is a schematic elevational view of an apparatus for making shingles according to the invention.
Figure 2:
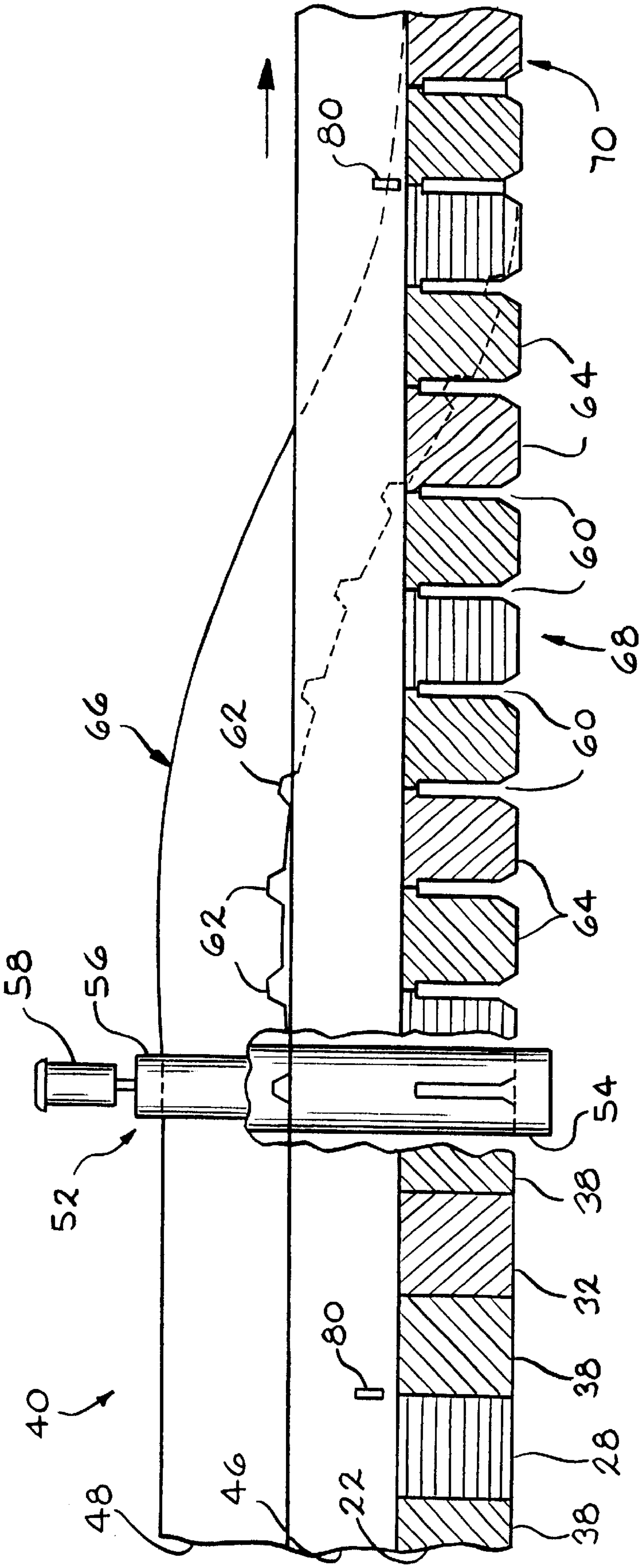
FIG. 2 is a plan view of a portion of the apparatus of FIG. 1, showing the laminating of the shingle underlay beneath the overlay to make a laminated strip.
Figure 3:
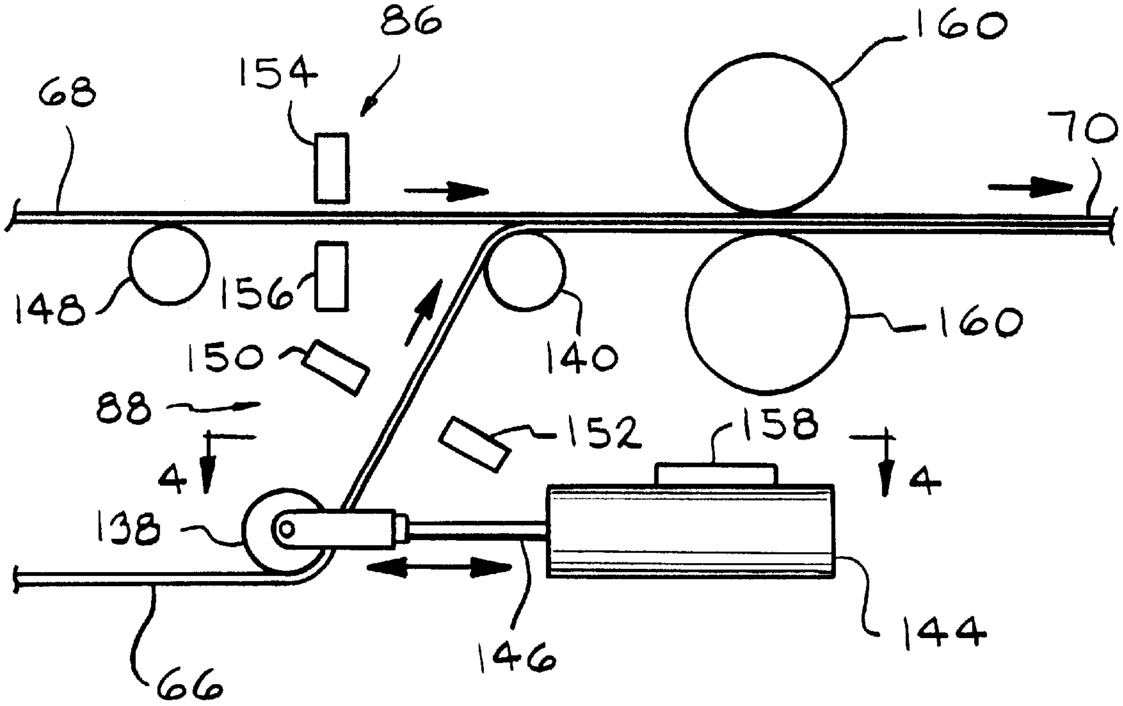
FIG. 3 is an enlarged elevational view of a portion of the shingle making apparatus of FIG. 1.
Figure 4:
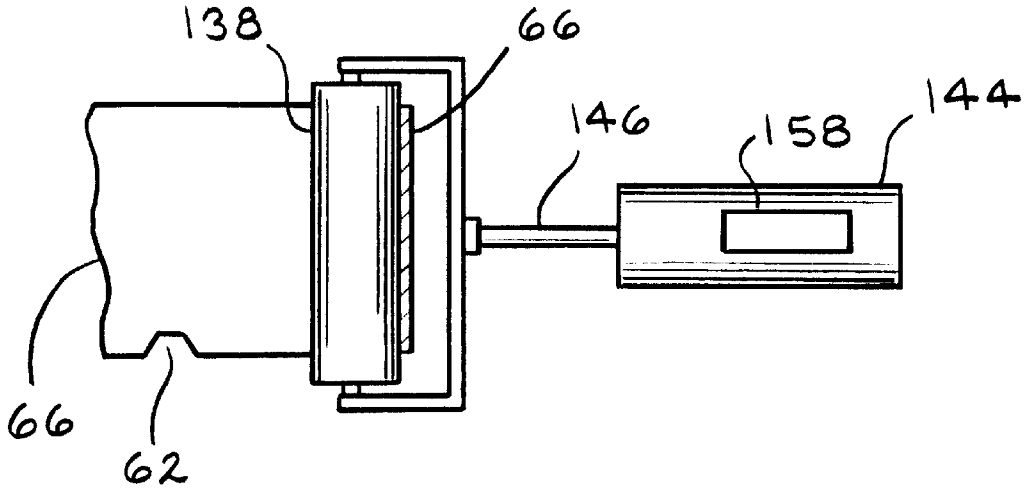
FIG. 4 is a plan view of a portion of the apparatus of FIG. 3.

The description and drawings disclose a method for synchronizing the placement of color patterns with cutouts in shingles. Referring now to the drawings, there is shown in FIGS. 1 and 2 an apparatus 10 for manufacturing an asphalt-based roofing material according to the invention. The illustrated manufacturing process involves passing a continuous sheet 12 in a machine direction (indicated by the arrows) through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute).

In a first step of the manufacturing process, a continuous sheet of substrate or shingle mat 12 is payed out from a roll 14. The substrate can be any type known for use in reinforcing asphalt-based roofing materials, such as a nonwoven web of glass fibers. The shingle mat 12 is fed through a coater 16 where an asphalt coating is applied to the sheet. The asphalt coating can be applied in any suitable manner. In the illustrated embodiment, the sheet is submerged in a supply of hot, melted asphalt coating to completely cover the sheet with the tacky coating. However, in other embodiments, the asphalt coating could be sprayed on, rolled on, or applied to the sheet by other means. Typically the asphalt material is highly filled with a ground stone filler material, amounting to at least about 60 percent by weight of the asphalt/filler combination.

The resulting asphalt coated sheet 18 is then passed beneath a series of granule dispensers 20 for the application of granules to the upper surface of the asphalt coated sheet. The granule dispensers can be of any type suitable for depositing granules onto the asphalt coated sheet. A preferred granule dispenser is a granule blender of the type disclosed in U.S. Pat. No. 5,599,581 to Burton et al., which is hereby incorporated by reference, in its entirety. The initial granule blender 24 deposits partial blend drops of background granules of a first color blend on the tab portion 22 of the asphalt coated sheet 18 in a pattern that sets or establishes the trailing edge of subsequent blend drops of a second color blend (of an accent color) and a third color blend (of a different accent color). For purposes of this patent application, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult. This technique of using initially applied partial blend drops is disclosed in U.S. Pat. No. 5,405,647 to Grubka et al., which is hereby incorporated by reference, in its entirety.

As is well known in the art, blend drops applied to the asphalt coated sheet are often made up of granules of several different colors. For example, one particular blend drop that is supposed to simulate a weathered wood appearance might actually consist of some brown granules, some dark gray granules and some light gray granules. When these granules are mixed together and applied to the sheet in a generally uniformly mixed manner, the overall appearance of weathered wood is achieved. For this reason, the blend drops are referred to as having a color blend, which gives an overall color appearance, and this overall appearance may be different from any of the actual colors of the granules in the color blend. Also, blend drops of darker and lighter shades of the same color, such as, for example, dark gray and light gray, are referred to as different color blends rather than merely different shades of one color.

After all the granules are deposited on the sheet, the granule covered sheet 40 is turned around a slate drum 44 to press the granules into the asphalt coating and to temporarily invert the sheet so that the excess granules will fall off and will be recovered and reused. The granule covered sheet 40 is subsequently fed through a rotary pattern cutter 52 which includes a bladed cutting cylinder 54, backup roll 56 and a motor 58, as shown in FIGS. 1 and 2. The pattern cutter 52 cuts a series of cutouts 60 in the tab portion 22 of the granule covered sheet 40, and also cuts a series of notches 62 in the underlay portion 48 of the granule covered sheet. It can be seen that the cutouts 60 divide the various color blend drops 28, 32, 38 into tabs 64, with each tab being one of the three colors of the blend drops, i.e., the background color or first color blend, the second color blend or the third color blend.

The pattern cutter 52 also cuts the granule covered sheet 40 into the continuous underlay sheet 66 and the continuous overlay sheet 68. As shown in FIG. 2, the underlay sheet is directed to be aligned beneath the overlay sheet, and the two sheets are laminated together to form a continuous laminated sheet 70. As shown in FIG. 1, the continuous underlay sheet 66 is routed on a longer path than the path of the continuous overlay sheet 68. Further downstream the continuous laminated sheet 70 is passed into contact with a rotary length cutter 72 that cuts the laminated sheet into individual laminated shingles 74.

In order to facilitate synchronization of the cutting and laminating steps, various sensors and controls can be employed. A timing mark 80 indicating the period of the blend drops 28, 32, 38 can be applied to an appropriate part of the shingle, such as the headlap portion 46, to be used for synchronization. The timing mark can be applied by any means, and can be a thin blend drop of granules applied by the timing mark blender 82. The timing mark 80 is preferably white colored granules 45, but can be any suitable light-colored material, such as paint, chalk, or the like. The timing can be sensed by a sensor, such as a photoeye 84, for synchronization with the rotating rotary pattern cutter 52 so that the cutouts 60 and notches 62 will be situated at the intersections of adjacent blend drops.

The continuous granule covered sheet 40 is fed through pull rolls 78 that regulate the speed of the sheet 40 as it moves downstream. In a preferred embodiment, at least one of the pull rolls 60 is driven by a motor (not shown).

Sensors, such as photoeyes 86 and 88 can be used to synchronize the continuous underlay sheet 66 with the continuous overlay sheet 68. Sensors 90 can be used to synchronize the notches and cutouts of the continuous laminated sheet with the end cutter or length cutter 72. An inductive pickup sensor 134 detects the rotary position of the cutting cylinder 54. Any suitable type of sensor may be used to detect the rotary position of the cutting cylinder. Signals from the timing mark sensor 84 and the pattern cutter sensor 134 can be routed to a controller, not shown, or any other means for controlling the relative positions of the timing marks 80 and the pattern cutter, to synchronize the position of the continuous granule covered sheet and the rotary pattern cutter with respect to each other.

The pattern of colored granules on the granule covered sheet 40 and the cutting cylinder 54 misaligned or out of synchronization with respect to each other during the manufacturing process. The synchronization can be achieved by adjusting the rate of rotation of the cutting cylinder 54 and/or by adjusting the rate at which the granule covered sheet 40 moves downstream. Because the pull rolls 78 regulate the rate of speed of the granule covered sheet 40, synchronization can be done by adjusting the rate at which the pull rolls 78 move the granule covered sheet 40.

Referring now to FIGS. 1–4, after the granule covered sheet 40 is divided, the continuous shingle underlay sheet 66 is preferably directed downstream through an underlay pathway 132 from the pattern cutter 52 to a moveable idler roll 138 and a joining roll 140. The underlay pathway is configured to change directions around the idler roller 138. The length of the underlay pathway is the distance the continuous shingle underlay sheet 66 travels from the pattern cutter 52 to the joining roll 140. The moveable idler roll 138 is attached to an actuator 144 by an arm 146. The actuator moves the arm 146 to modulate the underlay pathway distance.

A layer of adhesive is applied to a lower surface of the continuous shingle overlay sheet 68 by an adhesive applicator roll 148. The layer of adhesive causes the continuous shingle underlay sheet 66 to adhere to the continuous shingle overlay sheet 68 to form the continuous laminated sheet 70. In a preferred embodiment, the continuous shingle overlay sheet 68 and continuous shingle underlay sheet 66 are joined at the joining roll 140. When joined, the pattern of cutouts 60 in the continuous shingle overlay sheet 68 is preferably aligned with the pattern of notches 62 in the continuous shingle underlay sheet 66.

The underlay photoeye sensor 88 can be any suitable type of sensor for sensing the pattern of the underlay. Preferably the photoeye 88 has a transmitter 150 and a receiver 152 for sensing the presence of the notches 62 in the underlay sheet 66. The photoeye sensor 88 is preferably positioned downstream of the pattern cutter 52 along the underlay pathway 132. Also, in a preferred embodiment, the photoeye sensor 88 is positioned between the moveable idler roll 138 and the joining roll 140. Both of the photoeyes 86, 88 are connected to a controller 158, and an error signal is generated when a misalignment or lack of registration of the underlay with respect to the overlay is sensed. This lack of registration can occur for various reasons, such as variations is sheet tension and changes in product characteristics.

The position of the continuous shingle overlay sheet 68 is synchronized with respect to the position of the continuous shingle underlay sheet 66 in response to the sensed beginning of the repeated overlay pattern and the sensed beginning of the repeated underlay pattern. An example of lack of registration is when the leading edges of the notches 62 and the leading edges of the cutouts 60 reach the photoeyes 88, 86 respectively at different times. Although the in the embodiment of the invention shown the sensing is focused on the notches 62 and cutouts 60, in the broadest sense of the invention, the synchronization includes comparing the sensed occurrence (e.g. the beginning) of the repeated overlay pattern and the sensed occurrence (e.g. the beginning) of the repeated underlay pattern. An error signal indicative of the distance by which the beginning of the repeated overlay pattern is offset with respect to the beginning of the repeated underlay pattern is generated.

Synchronization can be accomplished by increasing or decreasing the underlay pathway distance, preferably in response to the error signal. The actuator 144 is electrically controlled and is connected to the controller 158. The actuator 144 moves the arm 146 attached to the idler roll 138, thus modulating the total distance of the underlay pathway 132. The newly established pathway distance is maintained until a new error signal is generated, at which time a the idler roll 138 will be moved again. It is to be understood that other devices can be used to re-establish registration once an error in synchronization is established. Various other rollers, not shown, can be used to change the length of the underlay pathway. Other ways of re-establishing synchronization include speeding up or slowing down either the overlay sheet 68 or the underlay sheet 66, or both.

In a preferred embodiment, combining rolls 160 are provided downstream from the joining roll 140. The combining rolls 160 can be operated to press the continuous shingle overlay sheet 68 together with the continuous shingle underlay sheet 66 to form the continuous laminated sheet 70. The continuous laminated sheet 70 is then cut into shingles 74 by a length cutter 72. The length cutter 72 can provided with an end cut sensor 162 for determining the registration of the length cutter with respect to the pattern on the shingle. One method of accomplishing this is to connect the end cut sensor 162 to the controller.

The principle and mode of operation of this invention have been described in its preferred embodiments. However, it should be noted that this invention may be practiced otherwise than as specifically illustrated and described without departing from its scope.

What is claimed is:

1. A method of making shingles, wherein the shingles include an overlay portion and an underlay portion comprising:

a. establishing a continuous shingle overlay sheet having a repeated overlay pattern;

b. establishing a continuous shingle underlay sheet having a repeated underlay pattern;

c. sensing the presence of the overlay pattern on the continuous shingle overlay sheet;

d. sensing the presence of the underlay pattern on the continuous shingle underlay sheet; and e. synchronizing the position of the continuous shingle overlay sheet with respect to the continuous shingle underlay sheet in response to the sensed presence of the repeated overlay pattern and the sensed presence of the repeated underlay pattern; and f. laminating the underlay and overlay portions;

g. cutting the laminated underlay and overlay portions into a shingle.

2. The method of claim 1 wherein the continuous shingle overlay sheet and the continuous shingle underlay sheet are formed by cutting a single continuous granule covered sheet.

3. The method of claim 1 including directing the continuous shingle underlay sheet along an underlay pathway, and wherein the synchronization is effected by modulating the length of the underlay pathway.

4. The method of claim 3 wherein the synchronization includes comparing a sensed beginning of the repeated overlay pattern and a sensed beginning of the repeated underlay pattern and generating an error signal indicative of the distance by which the beginning of the repeated overlay pattern is offset with respect to the beginning of the repeated underlay pattern, and modulating the length of the underlay pathway in response to the error signal.

5. The method of claim 3 wherein the underlay pathway is configured to change directions around a roller, and the roller is moved to change the length of the underlay pathway to synchronize the position of the continuous shingle overlay sheet with respect to the continuous shingle underlay sheet in response to the sensed presence of the repeated overlay pattern and the sensed presence of the repeated underlay pattern.

6. The method of claim 1 wherein the repeated overlay pattern is a cutout in the continuous shingle overlay sheet.

7. The method of claim 6 wherein the repeated underlay pattern is a notch in the continuous shingle underlay sheet.

8. A method of making shingles, wherein the shingles include an overlay portion and an underlay portion comprising:

establishing a continuous shingle overlay sheet having cutouts;

establishing a continuous shingle underlay sheet having notches;

sensing the presence of the cutouts on the continuous shingle overlay sheet;

sensing the presence of the notches on the continuous shingle underlay sheet;

synchronizing the position of the continuous shingle overlay sheet with respect to the continuous shingle underlay sheet in response to the sensing of the cutouts and the notches;

laminating the continuous shingle overlay sheet and the continuous shingle underlay sheet together; and cutting the laminated overlay and underlay sheets into a shingle.

9. An apparatus for making shingles comprising:

means for providing a continuous shingle overlay sheet having a repeated overlay pattern and a continuous shingle underlay sheet having a repeated underlay pattern;

a sensor for sensing a beginning of the overlay pattern on the continuous shingle overlay sheet;

a sensor for sensing a beginning of the underlay pattern on the continuous shingle underlay sheet; and means for synchronizing the position of the continuous shingle overlay sheet and the continuous shingle underlay sheet with respect to each other in response to the sensed beginning of the repeated overlay pattern and the sensed beginning of the repeated underlay pattern;

means for laminating the overlay and underlay sheets; and means for cutting the laminated sheets into a shingle.

10. The apparatus of claim 9 wherein the means for synchronizing includes an idler roll which is engaged by the underlay sheet, and an actuator connected to the idler roll to move the idler roll to change the length of an underway pathway.

* * * * *